(12) United States Patent
Anjum et al.

(10) Patent No.: US 7,576,694 B2
(45) Date of Patent: Aug. 18, 2009

(54) SECURE WIRELESS USER LOCALIZATION SCHEME USING TRANSMISSION RANGE VARIATION

(75) Inventors: Farooq Anjum, Somerset, NJ (US);
Byungsuk Kim, Kyunggi-do (KR);
Santosh Ghanshyam Pandey, Auburn University, AL (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 23 days.

(21) Appl. No.: 11/379,566

(22) Filed: Apr. 20, 2006

(65) Prior Publication Data

US 2007/0247367 A1    Oct. 25, 2007

(51) Int. Cl.
*G01S 3/02* (2006.01)
*H04Q 7/20* (2006.01)

(52) U.S. Cl. .................................. 342/464; 455/456.1
(58) Field of Classification Search ................. 342/457, 342/463–465; 455/456.1, 456.5, 456.6
See application file for complete search history.

(56) References Cited

U.S. PATENT DOCUMENTS

| 4,209,787 A * | 6/1980 | Freeny, Jr. .................... 342/457 |
| 5,530,440 A * | 6/1996 | Danzer et al. ................ 340/933 |
| 2005/0171429 A1* | 8/2005 | Mathew et al. ............... 600/437 |

OTHER PUBLICATIONS

Anjum et al, "Secure Localization in Sensor Networks using Transmission Range Variation", Nov. 2005, IEEE International Conference on Mobile Adhoc and Sensor System, pp. 1-9.*

N. Priyantha, "The Cricket Location-Support system," Proc. 6th ACM International Conference on Mobile Computing and Networking (ACM MOBICOM), Aug. 2000, p. 1-12, USA.

R. Want, "The Active Badge Location System," ACM Transactions on Information Systems, Jan. 1992, p. 1-7, vol. 10, Olivettie Research Ltd, England.

Y. Gwon, "Robust Indoor Location Estimation of Stationary and Mobile Users," IEEE Infocom, Mar. 2004, p. 1-12, DoCoMo Communications Laboratories, USA.

S. Ganu, "Infrastructure-based Location Estimation in WLAN Networks," IEEE Wireless Communications and Networking Conference (WCNC 2004), Mar. 2004, p. 1-6, vol. 1, USA.

P. Bahl, "RADAR: An In-Building RF-based User Location and Tracking System," Proceedings IEEE Infocom 2000, Mar. 2000, p. 1-10, vol. 2, Institute of Electrical and Electronics Engineers, Inc., USA.

A. Ladd, "On the Feasibility of Using Wireless Ethernet for Indoor Localization," IEEE Transactions on Robotics and Automation, Jun. 2004, p. 1-5, vol. 20, USA.

(Continued)

*Primary Examiner*—Dao L Phan
(74) *Attorney, Agent, or Firm*—Watchstone P+D, pllc; Stephen B. Parker, Esq.

(57) ABSTRACT

A secure localization method for wireless networks utilizes access point variable transmission power capability to transmit encoded localization signals at different power levels to a wireless device in the network. Based on the particular combination of encoded signals collected by the wireless device and reported back to a network controller, the location of the wireless device may be determined in conjunction with information contained in a location database.

19 Claims, 4 Drawing Sheets

OTHER PUBLICATIONS

S. Capkun, "Secure Positioning of Wireless Devices with Application to Sensor Networks," Proceedings of IEEE Infocom 2005, Mar. 2005, p. 1-12, USA.

L. Lazos, "SeRLoc: Secure Range-Independent Localization for Wireless Sensor Networks," 2004 ACM workshop on Wireless Security (ACM WiSe2004), Oct. 2004, p. 1-10, USA.

P. Castro, "A Probabilistic Location Service for Wireless Network Environments," Ubiquitous Computing 2001, Sep. 2001, p. 1-18, USA.

D. Madigan, "Bayesian Indoor Positioning Systems," Proceedings of INFOCOM 2005, Mar. 2005, p. 1-11, USA.

M. Youssef, "Wlan Location Determination via Clustering and Probability Distributions," IEEE PerCom 2003, Mar. 2003, p. 1-8, USAL.

L. Lazos, "ROPE: Robust Position Estimation in Wireless Sensor Networks", Proceedings of IPSN 2005, Apr. 2005, p. 1-8, USA.

D. Liu, "Attack-Resistant Location Estimation in Sensor Networks," Proceedings of the International Conference on Information Processing in Sensor Networks (IPSN), 2005, p. 1-8, USA.

N. Sastry, "Secure Verification of Location Claims," Wise 2003, 2003, p. 1-11, USA.

P. Tao, "Wireless LAN Location-sensing for Security Applications," Proceedings of the Second ACM Workshop on Wireless Security (WiSe), Sep. 2003, p. 1-10, USA.

Z. Li, "Robust Statistical Methods for Securing Wireless Localization in Sensor Networks," Proceedings of the International Conference on Information Processing in Sensor Networks (IPSN), 2005, p. 1-8, USA.

"Cisco Aironet 1100 Series Access Point Installation and Configuration Guide", Cisco IOS Release 12.2(4)JA, Oct. 2002, p. 1-322, Cisco Systems, Inc., USA.

P. Calhoun, "Light Weight Access Point Protocol (LWAPP)," Internet Draft, Jun. 2003, the Internet Society, p. 1-66, USA.

T. He, "Range-free Localization Schemes for Large Scale Sensor Networks," MobiCom 2003, Sep. 2003, p. 1-15, USA.

* cited by examiner

SECURE WIRELESS USER LOCALIZATION SCHEME USING TRANSMISSION RANGE VARIATION

BACKGROUND OF THE INVENTION

1. Field of the Invention

The present application relates generally to wireless networking and, in some preferred embodiments, to localization of wireless users in a wireless communication network; that is, determining the physical location of a wireless user for the purpose of deploying location-based services, or in order to detect the presence and location of intruders in the network.

2. General Background Discussion

Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer.

Wireless Networks

Wireless networks can incorporate a variety of types of mobile devices, such as cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including a single chip transceiver with an integrated transmitter, receiver and, if desired, other functions); an antenna; a processor; one or more audio transducers (for example, a speaker or a microphone as in devices for audio communications); electromagnetic data storage (such as ROM, RAM, digital data storage, etc., such as in devices where data processing is provided); memory; flash memory; a full chip set or integrated circuit; interfaces (such as USB, CODEC, UART, PCM, etc.); and/or the like.

Wireless LANs (WLANS) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

Localization of Wireless Users

Discovering the location of a wireless user has many purposes, ranging from sending rescue or emergency personnel to a user in distress who may be unable to identify her present location, to providing location customized wireless services, to detecting and locating intruders or other unauthorized users of a wireless networks. Many localization schemes have been proposed for wireless networks. Such schemes are typically based on the features of the underlying physical layer. For example, various schemes based on ultrasound, infrared, Bluetooth, and 802.11 RF networks have been proposed. These schemes infer the location of wireless users by measuring various signal parameters such as a received signal strength indicator (RSSI), time of flight, and angle of arrival. Some of these schemes are client-based, where the user determines his location and the network has no knowledge of the user's location, while others are network-based schemes where the network infrastructure is used to determine the location of the user. The former approach might be preferred when user privacy is a concern. In a vast majority of the known schemes, there is an assumption that none of the users in the system is malicious.

Known localization schemes proposed for WLAN (802.11) systems, are normally based on measuring the signal strength (SS) parameter. The concept is to determine a SS map of the area beforehand. The system then tries to determine the location of a user based on the best match between the signal strengths from the user as seen by multiple Access Points (APs) and the SS map. The match can be made based on deterministic or probabilistic techniques in order to improve the location accuracy and resolution. Typically, the SS values from a wireless device are compared with expected SS values and the location of the device is considered to be that value which minimizes the mean squared error.

There also has been some work recently on secure localization in the context of sensor networks. L. Lazos and R. Poovendran, "SeRLoc: Secure Range-independent Localization for Wireless Sensor Networks," Proceedings of WISE, Philadelphia, Pa., October 2004, discussed secure positioning in a network of sensors and proposed techniques based on the use of directional antennas. Localization in the presence of an intruder in a wireless network also has been disclosed, where explicit RF distance bounding was used in order to obtain a verifiable localization scheme. Certain schemes use a combination of directional antennae and explicit RF distance bounding. The use of covert base stations also has been disclosed. Techniques also have been proposed for the detection of malicious attacks against beacons which broadcast localization information in sensor networks. The detection is based on the use of time-of-flight (TOF) techniques to verify the consistency of information. One approach to location-based access control was provided in N. Sastry, U. Shankar and D. Wagner, "Secure Verification of Location Claims," WISE 2003. There, the focus is on location verification using ultrasound and time of flight techniques.

Schemes for secure localization in 802.11 networks also have been proposed. In S. Pandey, B. Kim, F. Anjum and P. Agrawal, "Client Assisted Location Data Acquisition Scheme for Secure Enterprise Wireless Networks," WCNC 2004, a secure localization scheme using SS values was proposed. A SS lookup table is built efficiently but is based on an enterprise-like environment with cooperating users. The paper indicated that by using a simple trilaterization based on an averaged signal strength lookup table, an accuracy of 85% with a location error range of about 10 ft was obtained. In P. Tao, A. Rudys, A. M. Ladd, and D. S. Wallach, "Wireless LAN location-sensing for security applications," Proceedings of the Second ACM Workshop on Wireless Security (WISE), San Diego, Calif., September 2003, a location estimation scheme based on building a SS lookup table is proposed. The SS table is built by taking SS readings at various locations. A "difference method" was developed that could detect the location of an intruder transmitting at various power levels. Mapping techniques were introduced in Z. Li, W. Trappe, Y. Zhang, and B. Nath, "Robust Statistical Methods for Securing Wireless Localization in Sensor Networks," Proceedings of the International Conference on Information Processing in Sensor Networks (IPSN), 2005, which proposed statistical methods for secure localization in wireless sensor networks. There, it was proposed to determine user location based on a mapping which minimizes the median squared error which is more robust in the presence of malicious users.

Using different technologies such as ultrasound, infrared, and Bluetooth for localization in RF based wireless networks would require additional hardware and hence are not cost efficient. Also, infrared has many drawbacks since it is restricted to line of sight and is affected by sunlight.

As pointed out above, most of the localization schemes proposed for WLAN (802.11) systems are normally based on measuring the signal strength (SS) parameter and have been developed without considering security and hence may be easily eluded by an intruder intent on spoofing his location. The SS at any location can be easily measured using a simple "sniffer" and hence a malicious user may easily use the measured SS information to spoof his location.

Additionally, many of the techniques based on sensor networks would not be appropriate for the purpose of secure localization in all wireless networks (e.g., 802.11 networks).

This is because of the need for special hardware such as directional antennae or hardware with very small time constraints (i.e., for RF distance bounding) and the fact that such special hardware is typically not preferred with all wireless networks. Also, these techniques are susceptible to various attacks.

Pandey et al., supra, assume an enterprise-like environment with cooperating users. Using the verification data from Pandey et al., the present inventors simulated the scenario of an intruder transmitting at a higher power level by increasing the received SS values by 25% and using the regular matching techniques based on least mean squares error. In this case, the localization scheme failed and the accuracy dropped from 85% (without power variation) to 19% (with power variation). The Tao et al. system (supra) has a poor accuracy of estimated locations, with 70% probability of a correct location estimate with a resolution of about 10 ft. Further, although the median scheme can be robust in the presence of malicious users, it is worse than the mean scheme under normal operating conditions.

Thus, while a variety of systems and methods are known, there remains a need for improved systems and methods of secure wireless user localization. The present application improves upon such systems and methods as described above.

SUMMARY OF THE INVENTION

The present invention solves the existing need by providing a localization scheme that utilizes existing capabilities of wireless network access points to transmit at varying transmission power levels. Encoded signals at different power levels are transmitted by the access points. Detected encoded signals are then collected by the wireless device, and reported back to a network control device such as an access point controller. The control device then determines the location of the wireless device based on the reported collection of encoded signals in consultation with a database containing access point location and transmission range information.

In particular, according to one aspect, the invention provides a method for determining the location of a wireless device in a wireless network, comprising the steps of transmitting to said wireless device from a plurality of wireless network access points a plurality of encoded signals at a plurality of different transmission power levels; receiving from said wireless device a set of encoded signals detected by said wireless device from among said plurality of transmitted encoded signals; and determining the location of said wireless device as a function of said set of encoded signals received from said wireless device.

According to another aspect of the invention, a system is provided for determining the location of a wireless device within a wireless network, including a plurality of wireless network access points deployed at predetermined locations in said wireless network; an access point controller having a database containing location and transmission power range capability of each of said access points; and a router for enabling said access point controller to communicate with said access points; wherein said access point controller issues commands to each of said access points to transmit a plurality of encoded signals at various transmission power levels within said transmission power range capability, and issues a command to said wireless device to collect detected encoded signals over a predetermined period of time and to transmit to said access point controller the collected encoded signals, whereby said access point controller determines a location of said wireless device based on the collected encoded signals received from the wireless device and information contained in said database.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION OF THE INVENTION

While the present invention may be embodied in many different forms, a number of illustrative embodiments are described herein with the understanding that the present disclosure is to be considered as providing examples of the principles of the various inventions described herein and that such examples are not intended to limit the invention to preferred embodiments described herein and/or illustrated herein.

Figure 1:
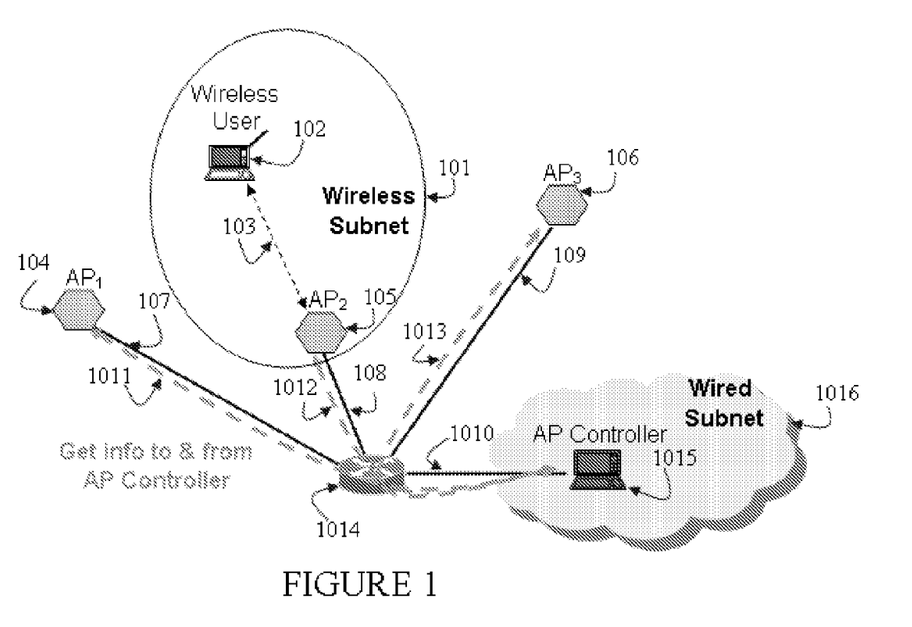
FIG. 1 is a schematic diagram of a wireless network topology of a type applicable to the concepts of the invention.

One embodiment of a localization method according to the invention, as implemented for an 802.11 network, is shown in FIG. 1. Generally the deployment of a wireless network involves at least one wireless subnet such as wireless subnet 101, in which wireless user devices such as wireless communication device 102 are connected to at least one wired subnet 1016 over a radio communication channel 103 to one or more Access Points, such as Access Point (AP) 105, and at least one router, such as router 1014. As shown, the wireless user device 102 is associated with $AP_2$ 105, and can communicate with $AP_2$ 105 via the wireless communication link 103. This embodiment of the invention is based on the location estimation being carried out by the network using at least three APs: 104; 105; 106.

In accordance with the concepts of the invention, the property of a current AP that enables it to transmit at different power levels is exploited. Use of a different power level will result in a different transmission range for the AP. The embodiment assumes that each location in the network system under consideration is within the maximum transmission range of multiple APs. Each AP in the system at a given time associates a "nonce," or random number, with each power level and securely transmits each nonce at that power level to the user whose location is to be determined. As a result, every location will have a unique set of nonces from multiple APs associated with it at any given point in time. This set depends on the power levels that each AP has to use to reach the location of interest, which in turn depends on the distance from the location to the various APs. Wireless user device 102 will be able to "hear" a particular set of nonces depending on its location with respect to the APs. The user device 102 is expected to securely transmit back the nonces received. The location of the user device 102 then can be determined based on the set of nonces transmitted back. The presence of multiple (i.e., at least three) APs makes it possible to securely determine the location of a wireless user device in the wireless network.

An AP Controller (APC) 1015 is a central entity that manages all of the APs and user devices of the network. The APC 1015 has detailed information about the user devices and APs, which may be obtained via repeated SNMP (Simple Network Management Protocol) queries. The APC 1015 either acts as a gateway router or controls a gateway router in order to set up an access control list for Intranet or Internet access. APC 1015 controls the localization process and is assumed to have the nonce set corresponding to each location within the deployment site. This may be obtained during a pre-deployment phase and may be maintained in a database (e.g., location_t-able).

The APC 1015 is connected to the various APs (104, 105, 106) in the network via the backbone wired network (1010, 1011, 1012, 1013, 1014). FIG. 1 also illustrates wired communication links 107, 108, and 109. The APs (104, 105, 106) act as a bridge between the internal wired and wireless subnet domains 1016 and 101. The APs (104, 105, 106) can be any commercially available access point with the ability to transmit at various power levels. Such multiple power level transmission capability is currently a feature built into various commercially available APs such as Cisco AP1100, D-Link DWL-2100AP, and others.

As explained earlier, the secure localization method according to one embodiment of the invention is based on transmission of nonces (random numbers) at different power levels from various APs. The location of a wireless user can be estimated depending on the set of nonces received by the user device and transmitted back to the APC via the APs.

Figure 2:
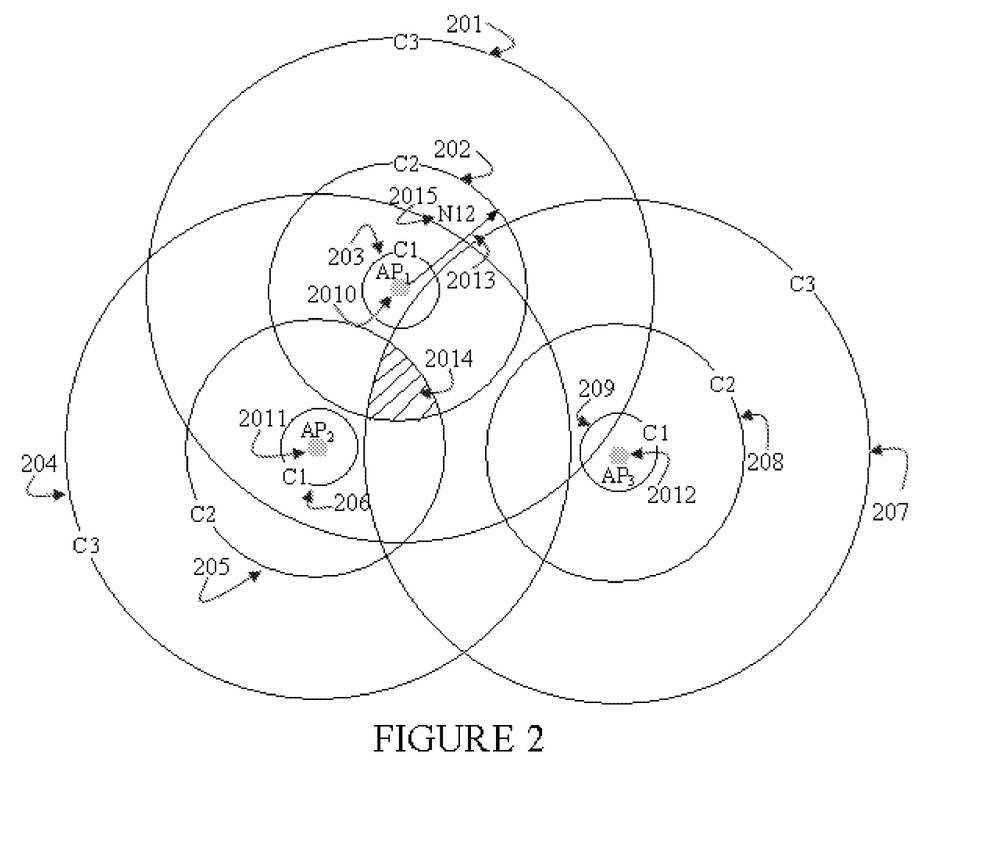
FIG. 2 is a schematic diagram showing various transmission power levels of access points and overlapping areas of transmission coverage in accordance with the concepts of the invention.

FIG. 2 shows APs 2010, 2011, 2012, which may correspond to APs 104, 105, 106 in FIG. 1. APs 2010, 2011 and 2012 transmit nonces at different power levels with transmission ranges shown as C1 (203, 206, 209), C2 (202, 205, 208) and C3 (201, 204, 207). The nonces are represented as Nij where 'i' corresponds to the transmitting AP and 'j' corresponds to the transmitting power level. For example, the $N_{12}$ nonce 2015 is transmitted from $AP_1$ (2010) at the second power level. As such, a wireless user device in the shaded region 2014 would receive the following nonce set $\{N_{12}, N_{13}, N_{22}, N_{23}, N_{33}\}$.

Figure 3:
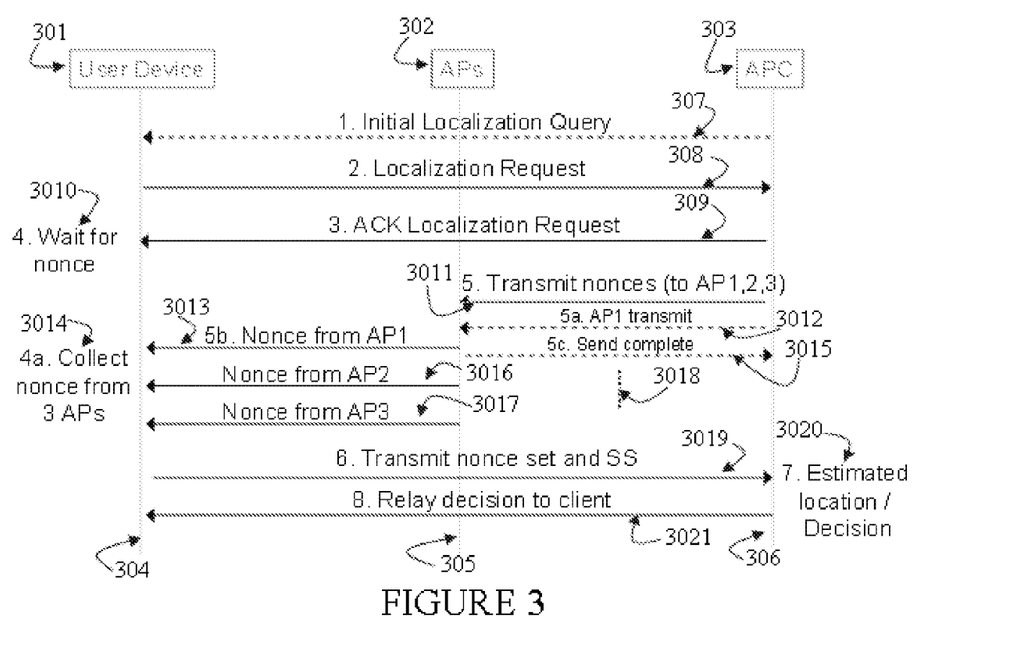
FIG. 3 is a diagram showing one possible sequence of interactions among a wireless device, access points, and an access point controller of a wireless network for performing a localization procedure in accordance with the invention.

FIG. 3 shows a message flow for implementing a secure localization scheme according to one embodiment of the invention. In Step 1, the APC 303 may initiate a localization query 307 for the wireless user device 301. The APC 303 may keep track of a localization timeout parameter for each user device along with their other details in its database. New clients would be added in this table as required and disassociated clients may be marked accordingly. The initial localization query 307 may be initiated due to a localization timeout for any associated user or when a new user attempts to access the wireless network. This query may also be triggered by either a significant change in the user's signal strength observed by its associated AP, or by association of the user device with a different AP. The localization query also contains the query ID (qID) as assigned by the APC. This may be built using a current timestamp and client MAC address.

In Step 2, a localization request 308 may be sent by the user device 301, either in response to the initial localization query 307 or when the user device 301 needs to know its current location. In the former case the localization request 308 would carry the qID as sent by the APC 303, while in the latter case a qID may be self-generated based on the user device's current timestamp and its MAC address.

In Step 3, the APC 303 performs a database look-up to determine the AP to which the wireless user device 301 is currently associated, and other APs in close proximity to the associated AP. The APC 303 then may notify the various APs of the localization procedure so that they can transmit the nonces. Each AP may report back its current load and any inability to transmit the nonce. The APC 303 would then decide which APs would actually transmit nonces and the various transmission power levels based on the reported AP capability. The APC 303 then sends a localization request acknowledgment (ACK) 309 with the qID to the user device 301. Based on the number of nonces to be transmitted, the APC 303 may optionally include a timeout value in the message 309 that would indicate the maximum time during which the user device 301 is to collect nonces.

In Step 4, the user device 301 monitors the wireless interface to receive the transmitted nonces 3010 from various neighboring APs. For this procedure the user device 301 either can be put into promiscuous mode, or, if the signal strength can be obtained on a per packet basis, then the user device 301 may be kept in managed mode while collecting nonces. In such case, however, the nonces from non-associated APs should be packaged (or injected) in a way that the user device 301 would recognize them as packets from a currently associated AP. The time period during which the nonces are collected is determined based on the timeout value from the message 309 or may default to some pre-defined value (e, 15 sec). In Step 4a, the received nonces 3014 are collected using standard packet monitoring and filtering functions or applications (e.g., tethereal and awk scripts).

In step 5, the APC 303 sends nonces 3011 along with the corresponding transmission power levels to each of the APs. Multiple nonces are transmitted at a single power level. Such nonces may be transmitted in the form Nijk, where 'i' corresponds to the transmitting AP, 'j' corresponds to the transmitting power level and 'k' corresponds to the multiple nonce sent by ith AP at jth power level. For example the $N_{121}$ nonce is the first nonce transmitted from $AP_1$ at the second power level. The power level is indicated as a number between 127 and 1 and may be set at the AP using the appropriate command or API (e.g., for HostAP implementation, the 'iwpriv <eth1> txpower <level>' command can be used). The message 3011 may be comprised of separate messages to individual APs as follows. In Step 5a the APC sends message 3012 to individual APs indicating the nonces to transmit and the corresponding power level. In Step 5b the APs transmit messages 3013, 3016, 3017 containing the nonces by setting the transmission power levels as indicated in the received message 3012 from the APC. In Step 5c, after the transmissions (3013, 3016, 3017) are completed, each of the APs would set its power level to maximum and send a message 3015 to APC 303 indicating that the transmission was carried out successfully. The above procedure is repeated until all the nonces have been broadcasted. It is noted that the APC 303 generates the nonces and instructs the APs to transmit the nonces at various power levels.

Next, in Step 6 the user device 301 transmits the collected nonces 3014 to the APC 303 in message 3019. The time period during which the user device 301 collects nonces is based on the timeout value in message 309. After the expiration of this timeout value, the received nonces are sent to the APC along with the corresponding SS values.

In Step 7, the APC 303 estimates the location of the user device 301 based on the nonces received from the user device in message 3019, the nonces transmitted by the APs, and the location_table database. Based on this estimation the APC 303 may now also decide if the user device 301 is inside or outside a particular room within the network site and set the appropriate access filter for the corresponding user device 301. The decision is taken based on the number of nonces received by the user device from various APs at various power levels. Note that multiple nonces were transmitted at a given power level from a single AP. The location estimation or the decision 3020 to provide a location-based service to a user device based on his current location will consider the number of nonces received by that user. For a user device to be considered present in a given location, it must receive at least a certain minimum number of nonce from certain APs and power levels, while for other APs and power levels only at most a few nonces may be received.

In Step 8, the decision 3020 is sent to the user device 301 as message 3021. This may be the location of the user device 301 as estimated by the APC 303. For example, a particular room in a wireless network campus may be considered and the decision is made whether the user 301 is inside or outside the room. Hence, the decision message that is relayed to the user may be as simple as IN or OUT.

Figure 4:
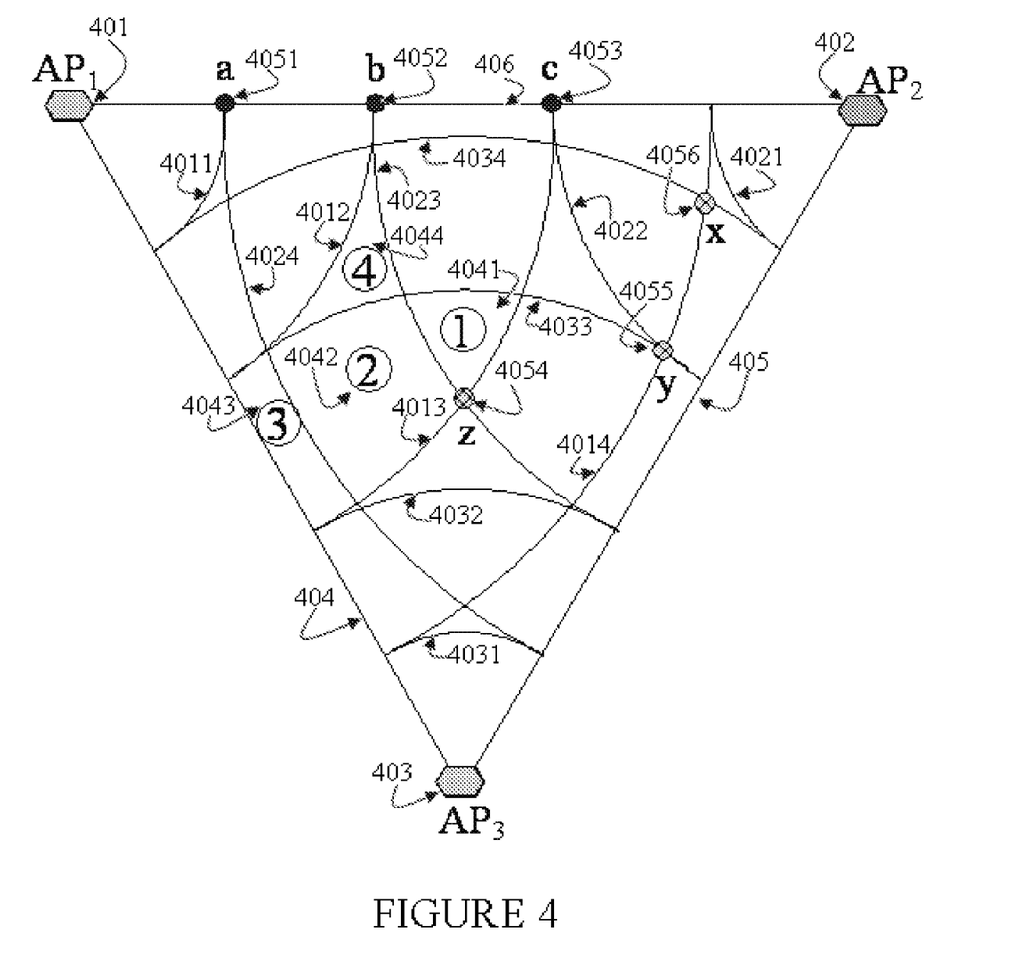
FIG. 4 is a diagram illustrating the concept of an "area of interest" and sub-regions with the area of interest as representing localization resolution areas, in accordance with the present invention.

As pointed out above, all the locations within the deployment site should be covered by the maximum transmission ranges of at least three APs. In order to achieve this, the optimal AP deployment would be to place APs at the edge of each other's maximum transmission range. Assuming all APs have the same maximum transmission power and that the resulting coverage area is equal and circular for all APs, the optimal deployment of the APs would be at the vertex of an equilateral triangle with the length of a side equal to the maximum transmission radius as shown in FIG. 4. We refer to the region bounded by the maximum transmission range of each of the three APs 401, 402, 403 as the "area of interest" or AOI, and the several areas formed by the intersecting curves inside the AOI as sub-regions. FIG. 4 shows the AOI bounded by lines 404, 405, 406 (circular segments are neglected). Each of the APs 401, 402, 403 is assumed to be capable of transmitting at 5 different power levels. The coverage area of each of these power levels for each AP is indicated in the figure. For example, the transmission ranges of $AP_1$ 401 within the AOI are indicated as 4011, 4012, 4013, 4014 and 405 (for the maximum transmission range the circular segment is neglected). A sub-region is the smallest bounded area in the AOI which corresponds to a unique subset of nonces. Four different sub-regions inside the AOI are shown marked as 1 (4041), 2 (4042), 3 (4043) and 4 (4044). The greater the size of the sub-region, the more coarse the location resolution will be.

The intersection point of a curve with the boundary of the AOI is called an "edge point." The number of edge points is denoted by Ne. The intersection points of curves within the AOI are called "internal points." The number of internal points is denoted by Ni. For example, in FIG. 4 the points marked as 'a'(4051), 'b'(4052), and 'c'(4053) represent edge points, while points marked as 'x'(4054), 'y'(4055), and 'z' (4056) are internal points. We have the following result related to the average resolution possible with the proposed secure localization algorithm.

Theorem 1: The average resolution using the proposed scheme is given by $$\frac{\sqrt{3}\, R^2/4}{N_e/2 + N_i + 1}$$

where R is the radius of the maximum transmission range.

The proof of the above theorem can be found in F. Anjum, S. Pandey, and P. Agrawal, "TRaVarSeL Transmission Range Variation based Secure Localization", Tech Report, http://www.eng.auburn.edu/pandesg/pub/TRaVarSeL.pdf, June 2005.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method for determining the location of a wireless device in a wireless network, comprising the steps of:
    transmitting to said wireless device from a plurality of wireless network access points a plurality of encoded signals at a plurality of different transmission power levels;
    receiving from said wireless device a set of encoded signals detected by said wireless device from among said plurality of transmitted encoded signals; and determining the location of said wireless device as a function of said set of encoded signals received from said wireless device.

2. The method of claim 1, wherein said plurality of wireless network access points comprises at least three wireless network access points.

3. The method of claim 2, wherein said wireless network access points are deployed at the vertex of an equilateral triangle with the length of a side equal to the maximum transmission radius of an access point.

4. The method of claim 1, wherein each of said plurality of encoded signals uniquely identifies a particular wireless network access point from which that one of said plurality of encoded signals was transmitted, and a transmission power level at which that one of said plurality of encoded signals was transmitted.

5. The method of claim 1, wherein transmission power level and signal encoding instructions are sent to each wireless network access point by an access point controller.

6. The method of claim 5, wherein said access point controller includes a location database storing location information of access points within said wireless network.

7. A system for determining the location of a wireless device within a wireless network, comprising:
a plurality of wireless network access points deployed at predetermined locations in said wireless network;
an access point controller having a database containing location and transmission power range capability of each of said access points; and
a router for enabling said access point controller to communicate with said access points; wherein
said access point controller issues commands to each of said access points to transmit a plurality of encoded signals at various transmission power levels within said transmission power range capability, and issues a command to said wireless device to collect detected encoded signals over a predetermined period of time and to transmit to said access point controller the collected encoded signals, whereby said access point controller determines a location of said wireless device based on the collected encoded signals received from the wireless device and information contained in said database.

8. The system of claim 7, wherein said plurality of wireless network access points comprises at least three wireless network access points.

9. The system of claim 8, wherein said wireless network access points are deployed at the vertex of an equilateral triangle with the length of a side equal to the maximum transmission radius of an access point.

10. The system of claim 7, wherein each of said plurality of encoded signals uniquely identifies a particular wireless network access point from which that one of said plurality of encoded signals was transmitted, and a transmission power level at which that one of said plurality of encoded signals was transmitted.

11. The system of claim 7, wherein transmission power level and signal encoding instructions are sent to each wireless network access point by said access point controller.

12. A method of localization of a wireless device in a wireless network, comprising the steps of:
initializing a localization query from an access point controller to said wireless device;
receiving a localization request response from said wireless device;
instructing a plurality of wireless network access points to transmit encoded transmission power level signals;
instructing said wireless device to collect detected encoded transmission power level signals over a predetermined period of time;
receiving from said wireless device a collection of detected encoded transmission power level signals after expiration of said predetermined period of time; and
estimating the location of said wireless device in said wireless network based on the received collection of encoded transmission power level signals.

13. The method of claim 12, further comprising the step of informing said wireless device of its estimated location within said wireless network.

14. A method of localization of a wireless device in a wireless network, comprising the steps of:
receiving a localization request from said wireless device;
instructing a plurality of wireless network access points to transmit encoded transmission power level signals;
instructing said wireless device to collect detected encoded transmission power level signals over a predetermined period of time;
receiving from said wireless device a collection of detected encoded transmission power level signals after expiration of said predetermined period of time;
estimating the location of said wireless device in said wireless network based on the received collection of encoded transmission power level signals; and
informing said wireless device of its estimated location within said wireless network.

15. The method of claim 1, wherein said step of transmitting to said wireless device from a plurality of wireless network access points a plurality of encoded signals at a plurality of different transmission power levels, includes transmitting to said wireless device from each of said plurality of wireless network access points a plurality of encoded signals at a plurality of different transmission power levels, and wherein each of said plurality of wireless network access points transmits at a plurality of different transmission power levels and transmits a plurality of different encoded signals corresponding to different ones of said transmission power levels.

16. The method of claim 15, wherein said plurality of encoded signals include a plurality of nonces, with each nonce unique to a respective one of said wireless network access points and associated with a particular power level.

17. The method of claim 4, wherein said step of transmitting to said wireless device from a plurality of wireless network access points a plurality of encoded signals at a plurality of different transmission power levels, includes transmitting to said wireless device from each of said plurality of wireless network access points a plurality of encoded signals at a plurality of different transmission power levels, and wherein each of said plurality of wireless network access points transmits at a plurality of different transmission power levels and transmits a plurality of different encoded signals corresponding to different ones of said transmission power levels.

18. The method of claim 17, wherein said plurality of encoded signals include a plurality of nonces, with each nonce unique to a respective one of said wireless network access points and associated with a particular power level.

19. The method of claim 7, wherein said access point controller issues commands to each of said access points to transmit said plurality of encoded signals, with each of said plurality of encoded signals corresponding to different ones of a plurality of transmission power levels.

* * * * *

UNITED STATES PATENT AND TRADEMARK OFFICE
CERTIFICATE OF CORRECTION

PATENT NO. : 7,576,694 B2  Page 1 of 1
APPLICATION NO. : 11/379566
DATED : August 18, 2009
INVENTOR(S) : Anjum et al.

It is certified that error appears in the above-identified patent and that said Letters Patent is hereby corrected as shown below:

In the Specification

In Column 2, Line 13, delete "(WLANS)" and insert -- (WLANs) --, therefor.

In Column 4, Line 31, delete "trilaterization" and insert -- trilateralization --, therefor.

In Column 8, Line 39, delete "(e, 15 sec)." and insert -- (e.g., 15 sec). --, therefor.

Signed and Sealed this
Ninth Day of December, 2014

Michelle K. Lee
*Deputy Director of the United States Patent and Trademark Office*